United States Patent [19]

Paranjpe et al.

[11] 4,238,805

[45] Dec. 9, 1980

[54] INK JET PRINTER STARTUP AND SHUTDOWN PROCEDURE

[75] Inventors: Suresh C. Paranjpe, Dallas; James W. Davis, Richardson, both of Tex.; Robert J. Scranton; Roger D. Wells, both of Dayton, Ohio

[73] Assignee: The Mead Corporation, Dayton, Ohio

[21] Appl. No.: 75,055

[22] Filed: Sep. 12, 1979

[51] Int. Cl.$^2$ .............................................. G01D 15/18

[52] U.S. Cl. .............................................. 346/75; 346/11; 346/140 R

[58] Field of Search .............................. 346/1, 75, 140 R

[56] References Cited

U.S. PATENT DOCUMENTS

| | | | |
|---|---|---|---|
| 3,701,998 | 10/1972 | Mathis | 346/75 |
| 4,031,561 | 6/1977 | Paranjpe | 346/75 X |
| 4,069,486 | 1/1978 | Fox | 346/75 |
| 4,081,804 | 3/1978 | Van Breeman et al. | 346/75 |
| 4,160,982 | 7/1979 | Keur | 346/140 R X |

OTHER PUBLICATIONS

Krause, K. A., Ink Jet Head, IBM Technical Disclosure Bulletin, vol. 19, No. 8, Jan. 1977, pp. 3216-3217.

Mix, A. L. Jr., Charge Electrode Alignment and Retraction, IBM Technical Disclosure Bulletin, vol. 20, No. 1, Jun. 1977, pp. 33-34.

*Primary Examiner*—George H. Miller, Jr.
*Attorney, Agent, or Firm*—Biebel, French & Nauman

[57] ABSTRACT

An ink jet printer includes a print head means which generates two parallel rows of jet drop streams. Charge electrodes are mounted on a pair of charge electrode plates which are movable into and out of drop charging positions. A pair of catchers each define a drop catching surface and a drop ingesting slot along the lower edge of the drop catching surface. Each of the catchers is generally pivotally mounted for rotation about an axis parallel to the rows of jet drop streams. The catchers may be pivoted from a drop catching position, in which the drop catching surfaces are substantially parallel, to a full catch position in which drop catching surfaces are inclined to face upward and intercept the jet drop streams. In the full catch position, the drop ingesting slots are positioned closely together. A linkage arrangement is provided for pivoting the catchers from the full catch position to the drop catch position after start up of the print head means. The linkage arrangement also moves the charge electrode plates into the drop charging positions after the catchers are pivoted sufficiently to apply a drop deflecting potential to thereto, but while the drop catching surfaces intercept the jet drop streams.

12 Claims, 12 Drawing Figures

INK JET PRINTER STARTUP AND SHUTDOWN PROCEDURE

BACKGROUND OF THE INVENTION

The present invention relates to ink jet printing and, more particularly, to an ink jet printer in which printer operation and reliability at start up and shut down are enhanced. A number of problems are encountered at the initiation of operation of an ink jet printer and at termination of printer operation.

Typically, ink jet printers include a print head defining a fluid manifold or reservoir to which electrically conductive ink is supplied under pressure. A plurality of orifices are defined by an orifice plate, with each of the orifices communicating with the fluid reservoir. The orifices may typically be positioned in a pair of parallel rows, as illustrated in U.S. Pat. No. 3,701,998, issued Oct. 31, 1972, to Mathis. Ink is forced under pressure through the orifices and emerges as a plurality of fluid filaments. Varicosities are generated in the fluid filaments by mechanical stimulation of the orifice plate or by generating pressure waves which travel through the ink in the fluid reservoir. The filaments are thereby caused to break up into streams of ink drops of substantially uniform size and spacing.

Charge electrodes are positioned beneath the orifice plate and adjacent the filament tips. Charge potentials selectively applied to the charge electrodes induce corresponding charges on the drops formed from the filament tips. The charged and uncharged drops then pass downwardly through a deflection field, with the charged drops deflected into a first set of trajectories and the uncharged drops unaffected passing through the field. Drop catchers are positioned outwardly of the rows of jet drop streams and in some printers may cooperate with with a deflection electrode, extending between the rows of jet drop streams, to produce deflection fields when a deflection potential is applied between the deflection electrode and the catchers. Alternatively, the deflection electrode may be eliminated with a deflection potential being placed across the opposing catchers to produce a deflection field. With such an arrangement, drops in each of the rows of jet drop streams are charged to opposite polarities to effect outward deflection of charged drops toward the catchers. Drops may be charged binarily or to a plurality of charge levels, as required by the particular printer configuration. Drops not sufficiently deflected to strike a catcher pass through the deflection field and are deposited upon a print receiving medium.

At start up of such a printer, the fluid flow through the orifices and the formation of drops from the filaments are extremely irregular and unpredictable. Exceptionally large drops of ink may be formed from the filaments and the trajectories of such drops are relatively uncontrolled. As a consequence, large amounts of ink may be deposited upon the charge electrodes and upon the deflection field electrode structure. Such large drops tend to short out the charge electrodes and deflection electrode structure, and may also interfere with the trajectories of the jets once stable jet operation is obtained. The large drops cannot be predictably deflected toward the catchers because generally it is not possible to apply a significant charge to the irregularly sized drops. Even if a charge were to be induced in such drops, the charged to mass ratio of the drops may be so small as to preclude effective deflection of the drops. Similar problems are encountered at shut down of the printer as the pressure of the ink is reduced and fluid flow through the orifices of the orifice plate is terminated.

Several approaches have been taken in order to overcome the problems presented by jet instability at start up and shut down of an ink jet printer. As shown in U.S. Pat. No. 4,081,804, issued Mar. 28, 1978, to Van Breemen et al, a print head has been mounted over a drip pan at start up to collect drops formed from the fluid filaments until the jets become stable. A print receiving medium is thereafter passed beneath the print head, above the drip pan, and printing is initiated. The Van Breemen et al patent also discloses pivotal mounting arrangements for the catchers in which the catchers may be pivoted downward and outwardly from the print head to permit inspection of the charge electrode structure.

In *IBM Technical Disclosure Bulletin,* Vol. 20, No. 1, June 1977, pp. 33 and 34, a charge electrode structure is shown in which a notched charge electrode plate is pivoted or, alternatively, translated into position adjacent the jet drop streams after start up to reduce wetting of the charge electrodes by the unstable jet drop streams.

*IBM Technical Disclosure Bulletin,* Vol. 19, No. 8, January 1977, pp. 3216 and 3217, discloses an ink jet printer in which a pair of charge electrode plates are moved laterally into and out of operating positions after start up and prior to shutdown, respectively. Additionally, a pair of catchers, positioned outwardly of the two parallel rows of jet drop during operation of the printer, are moved laterally together into contact at start up and shut down to prevent splatter of the ink on the print receiving medium. All of the drops are charged and deflected before the catchers are moved apart at start up, and before catchers are moved together at shut down, to prevent the drops produced by the unstable jets from reaching the paper beneath the print head or the paper support structure. Since the catchers in this print head are moved together beneath the pair of rows of jet drop streams which then strike the upper surfaces of the catchers, it is necessary that the upper surfaces of the catchers be formed of a porous material to ingest adequately the substantial flow of ink which is produced by the jets. Additionally, since the catchers are maintained in contact until after charging and deflection of the drop streams is initiated at start up, additional deflection electrodes are necessary in order to provide a deflection field and the catchers themselves may not be used to provide such a field.

Accordingly, there is a need for a simple, reliable arrangement for an ink jet printer which ensures that drops formed from unstable jets at start up and shut down are caught and, further, that the charge electrode structure and other printer elements are not contaminated by drops produced from the unstable jets.

SUMMARY OF THE INVENTION

An ink jet printer for depositing ink drops on a print receiving medium includes a print head means for generating a plurality of jet drop streams, with the streams being arranged in at least one row. A charge electrode means is mounted for movement between an inactive position, and a drop charging position. A pair of drop catchers is provided with each catcher defining a drop impingement surface. A pair of catchers are pivotable into drop catching positions with the drop impingement surfaces being substantially parallel and positioned on opposite sides of the row of jet drop streams for catching drops deflected thereto by an electrostatic deflection field. The pair of catchers are also pivotable into full catch positions in which the drop impingement surfaces are inclined with respect to the row of jet drop streams, with the lower edges of the drop impingement surfaces being substantially closer together than when in the drop catching positions. A means is provided for moving the charge electrode means between the drop charging position and the inactive position and, simultaneously, pivoting the pair of drop catchers between the drop catching positions and the full catch positions, whereby drops are caught continuously by the catchers before and after printing without charging of the drops, thus increasing the reliability of the printer at start up and shut down. A means is provided for applying a drop deflecting potential between the pair of drop catchers when the lower edges of the drop impingement surfaces are substantially separated, whereby a drop deflection field is created to deflect charged drops toward the catchers.

The charge electrode means includes a plurality of charge electrodes, each of the charge electrodes being positioned adjacent a respective one of the jet drop streams when the charge electrode means is in its drop charging position. The ink jet printer may further comprise a means for selectively supplying charging potentials to the plurality of charge electrodes when the charge electrode means is in the drop charging position and for terminating application of such charging potentials to the electrodes when the charge electrode means is in the inactive position. The means for moving the charge electrode means and pivoting the pair of drop catchers may comprise mechanical linkage means, interconnecting the charge electrode means and the drop catchers, and means for translating the mechanical linkage means.

The ink jet printer is operated according to the following steps, at initiation of printer operation:

(a) positioning a pair of drop catchers between a print head and a print receiving medium with the drop impingement surfaces thereof facing generally upward such that the lower edges of the catchers are substantially abutting, (b) generating a pair of jet drop stream rows, one of each of the pair of rows striking the drop impingement surface of each of the catchers, (c) pivoting the catchers such that the lower edges thereof are separated while continuing to receive drop streams on the drop impingement surfaces, (d) moving charge electrodes into position above the catchers and adjacent the drop streams, and applying a charging potential to said charge electrodes, for charging drops in the drop streams, while simultaneously applying a drop deflecting potential across the catchers, and (e) pivoting the catchers to a final drop catch position in which the drop impingement surfaces are substantially perpendicular and spaced outwardly from the jet drop stream rows, such that only drops which are charged by the charge electrodes and deflected by the drop deflecting potential strike the drop impingement surfaces.

At termination of operation of the printer, the printer is operated according to the following steps:

(f) pivoting the catchers such that the lower edges thereof are separated substantially and with the drop impingement surfaces facing generally upward and moved inwardly such that the jet drop streams impinge thereon, (g) discontinuing application of the drop deflecting potential to the catchers, and moving the charge electrodes away from the rows of jet drop streams, while discontinuing application of said charging potential to said charge electrodes, (h) pivoting the drop catchers such that they are positioned together beneath the print head with the lower edges of the catchers substantially abutting and with the drop impingement surfaces thereof facing generally upward, and (i) terminating generation of the jet drop streams.

Accordingly, it is an object of the present invention to provide an ink jet printer and method of printer operation in which printer operation and reliability at start up and shut down are enhanced; to provide such a printer and method of printer operation in which both the catchers and the charge electrodes are movable; to provide such a printer and method of printer operation in whch the catchers are pivoted together at start up and shut down to catch drops from relatively unstable jet drop streams; and to provide such a printer and method of printer operation in which a deflection potential is established across the catchers, and a charging potential applied to said charge electrodes, prior to movement of the catchers into an operational position.

BRIEF DESCRIPTION OF THE DRAWINGS

FIGS. 3(*a*) and 3(*b*) are views similar to FIGS. 2(*d*) and 2(*a*), respectively, showing the catchers in cross-section;

DETAILED DESCRIPTION OF THE PREFERRED EMBODIMENT

Figure 1:
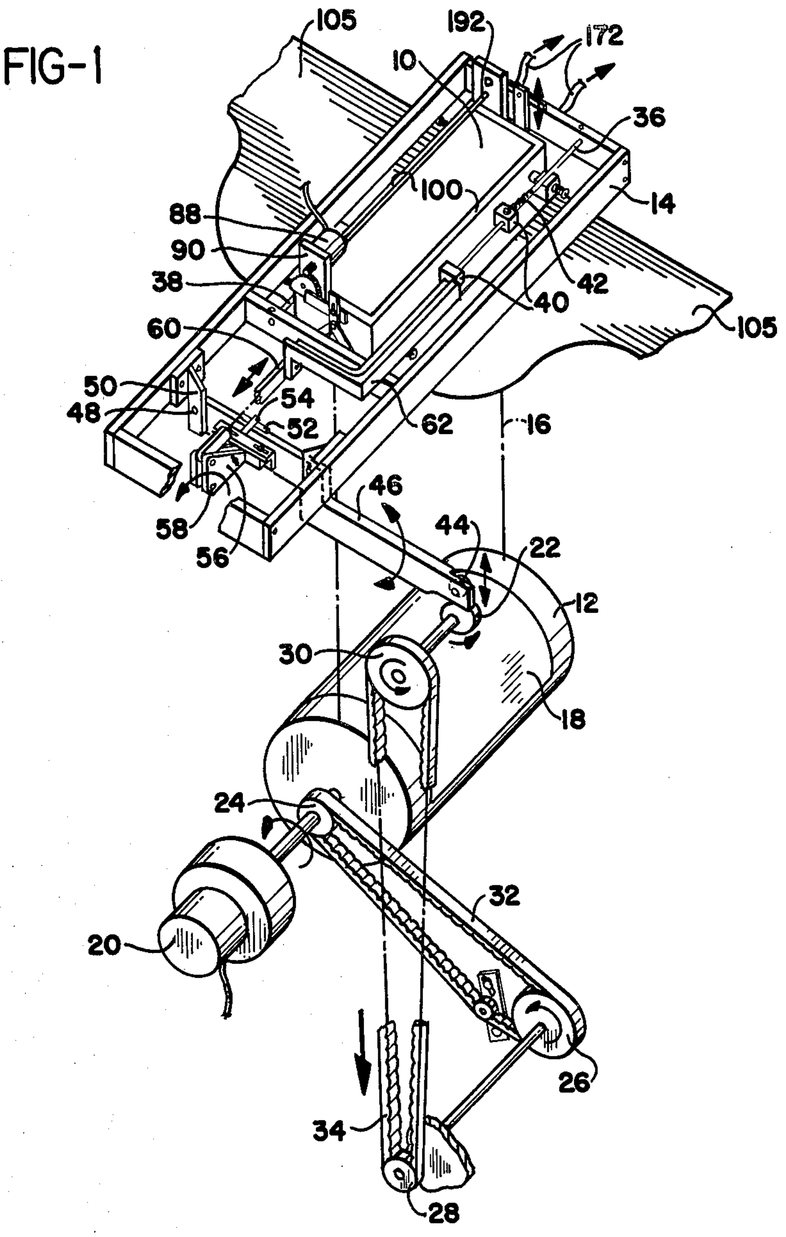
FIG. 1 is a perspective view of an ink jet printer constructed according to the present invention with portions moved apart and broken away.
Figure 2A:
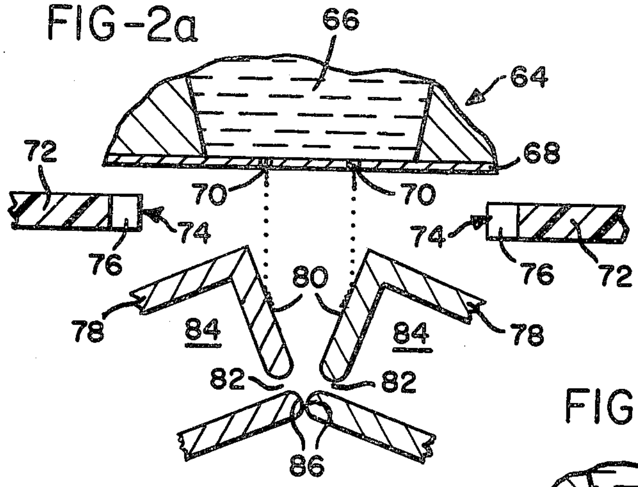
FIGS. 2(*a*)–2(*d*) are diagrammatic cross-sectional views, illustrating movement of the catchers and the charge electrode plates at start up and shut down of the printer.
Figure 2D:
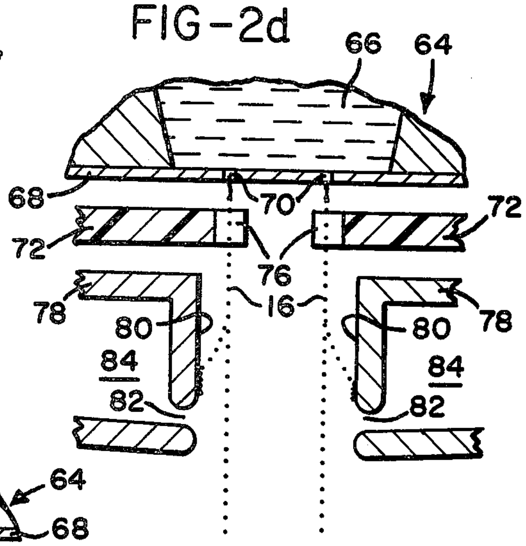
Figure 2B:
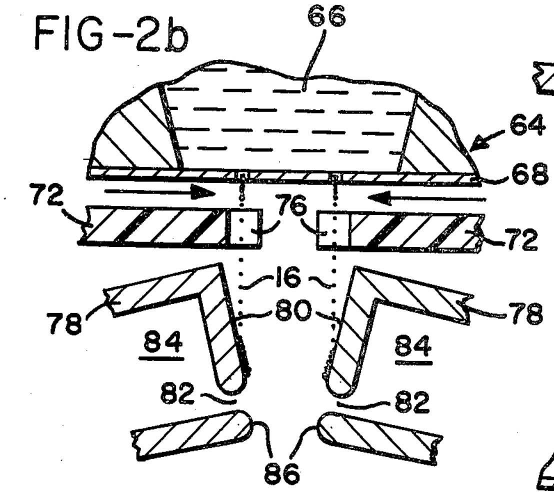
Figure 2C:
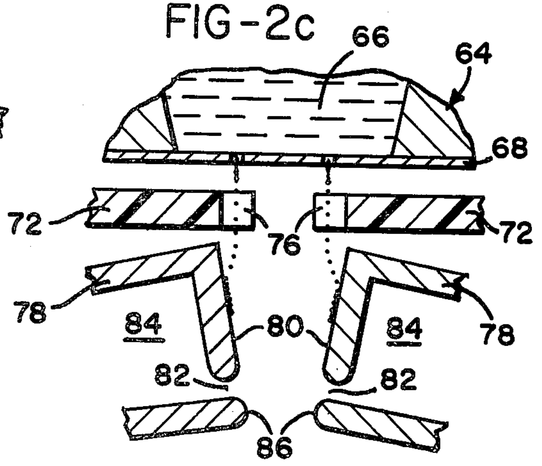

Reference is made to FIG. 1 which illustrates a printer constructed according to the present invention, with printer elements spaced apart and broken away to facilitate understanding of the printer. A print head 10 is mounted adjacent a paper supporting drum 12 within a stationary frame 14. Print head 10 is linearly movable in a direction parallel to the axis of rotation of the drum 12 and generates a plurality of jet drop streams indicated generally at 16. The jet drop streams are preferably positioned in a pair of parallel rows with the streams being staggered such that they are deposited along uniformly spaced print lines on print receiving medium such as sheet of paper 18 mounted on drum 12. The print lines printed during one rotation of the drum 12 are spaced apart in a direction parallel to the axis of rotation of the drum 12 by a distance which is greater than the distance between adjacent print lines in the completely printed copy. By moving the print head 10 laterally during each of a number of successive rotations of the drum, each jet prints a band of print lines on the sheet 18, with adjacent bands of print lines being printed by adjacent jets. Thus, the print head 10 is shifted laterally during the printing operation in a direction parallel to the axis of rotation of the drum 12 by a distance equal to the spacing between adjacent jets.

Drum 12 may advantageously define a plurality of vacuum openings in the surface thereof to which a partial vacuum is applied such that a sheet of paper supplied to the drum 12 is securely held on the drum surface during the printing operation as the drum is rotated. Paper is supplied to the drum prior to printing and removed from the drum after printing by supply and removal arrangements (not shown) which, for example, may take the form disclosed in copending U.S. patent application, Ser. No. 007,999, filed Jan. 31, 1979, and assigned to the assignee of the present invention.

Drum 12 is driven at a substantially constant rotational rate by motor 20. A rotatable cam 22 is also driven by the motor 20, via timing pulleys 24, 26, 28, and 30, and timing belts 32 and 34.

Print head 10 is mounted for linear movement within support frame 14 by means of parallel rods 36 and 38. A pair of linear bearings 40, mounted on print head 10, engage rod 36 and permit the print head 10 to slide along the rod. Similarly, a roller arrangement (not shown) mounted on the opposite side of the print head 10, engages rod 38, rolling along the rod and permitting the print head 10 to move in a direction parallel to the rods 36 and 38. A spring 42 engages the top of one of the linear bearings 40 and a screw threaded into rod 36, such that the print head 10 is spring biased generally to the right as seen in FIG. 1.

Acting against the spring bias force of spring 42 is a cam follower arrangement which follows the continuous camming surface of cam 22 and moves the print head 10 parallel to the axis of rotation of the paper supporting drum 12 such that the jet stream 16 are directed to deposit drops along respective ones of the print lines during successive rotations of the drum. The cam follower arrangement includes a cam follower roller 44 and a cam follower lever 46 which pivots about pivot point 48 on bracket 50. Roller 44 follows the camming surface of cam 22 such that the lever 46 is raised and lowered by rotation of the cam 22.

Attached to the upper portion of lever 46 is a pin 52 which contacts pin 54. Pin 54 extends from generally triangular-shaped motion reducing lever member 56 which is mounted to pivot about point 58. A linkage member 60 is pivotally attached to the lever member 56 and to an L-shaped bar 62 which forms part of print head 10. Bar 62 is rigidly attached to one of the linear bearings 40.

As the cam 22 is rotated, the lever 46 pivots vertically in dependence upon the shape of the camming surface. This vertical movement is transferred to the motion reducing lever member 56 as a result of the contact between pins 52 and 54. Pivoting of member 56 results in lateral shifting of the linkage member 60 with the result that the print head 10 is shifted against the opposing spring bias force of spring 42. The details of the cam arrangement by which the print head 10 is laterally shifted are disclosed more fully in copending U.S. patent application, Ser. No. 075,056, filed Sept. 12, 1979. and assigned to the assignee of the present invention.

Reference is now made to FIGS. 2(*a*)–2(*d*) and FIGS. 3(*a*)–3(*b*) which illustrate the manner in which start up and shut down of the printer are accomplished according to the present invention. A print head means 64 defines a fluid reservoir 66 to which ink is supplied under pressure. An orifice plate 68 defines a plurality of orifices 70 which are positioned in a pair of parallel rows. A charge electrode means includes a pair of charge plates 72 which have a plurality of charge electrodes positioned along their inner edges 74. Edges 74 define a plurality of notches which correspond to and are aligned with the jets in the respective rows of jet drop streams. The charge electrodes 76 may typically comprise platings of electrically conductive material within the notches. Electrical conductors plated onto the surfaces of the plates 72 provide a means for supplying the electrodes 76 with appropriate charge potentials such that the drops within the drop streams are selectively charged.

A pair of drop catchers 78 are provided with each catcher defining a drop impingement or catching surface 80 and a drop ingesting slot 82 along the lower edge of the surface 80. As illustrated in FIG. 2(*d*), when the printer is printing, the drop impingement surfaces 80 are positioned generally parallel to the rows of jet drop streams 16 and are spaced outwardly therefrom. A deflection potential is placed across electrically conductive catchers 78 such that a drop deflecting field is generated in the region between the parallel impingement surfaces 80. By supplying charge potentials of opposite polarity to the charge electrodes associated with the two rows of jet drop streams, the drops which are charged in each of the rows are deflected outwardly such that they strike the drop impingement surfaces 80. After striking a surface 80, the drops tend to run down the surface and will thereafter be ingested into a slot 82 by a partial vacuum applied to cavity 84 within the catcher 78.

In order to facilitate start up of the printer, the sequence illustrated in FIGS. 2(*a*)–2(*d*) is utilized. Initially, as shown in FIG. 2(*a*), the catchers 78 are positioned in a full catch position between the print head and a print receiving medium, with the drop impingement surfaces 80 facing generally upward such that the lower edges 86 of the catchers, beneath the slots 82, are substantially abutting. No deflection potential is applied across the catchers at this time and, it will be appreciated, that it would not be possible to apply a substantial potential across the catchers 78 due to their proximity. Ink is then supplied to the fluid reservoir 66 under pressure and relatively unstable fluid jets emerge through orifices 70. Stimulation, in the form of mechanical stimulation of the orifice plate 68 or pressure waves transmitted through the fluid in reservoir 66, results in the jets subsequently becoming stable, and drops of uniform size and spacing being generated by each of the jet drop streams.

The charge plates 72 are then moved inwardly as shown in FIG. 2(*b*) as the catchers 78 are pivoted downward and outward to an intermediate position. Note in FIG. 2(*b*) that the drop impingement surfaces 80 continue to be positioned such that uncharged drops from the jet drop streams 16 strike the catchers. Charge potentials are then applied to all of the charge electrodes 76 and a deflection potential is applied across the catchers 78 to create the desired deflection field. Since the catchers 78 are substantially separated at this point, it is possible to apply a full deflection field potential across the catchers 78 without arcing.

Charging and deflection of the drops in the jet drop streams, with the catchers in their intermediate positions, result in the drops being deflected outwardly, as shown in FIG. 2(*c*), such that they strike the drop impingement surfaces 80 at somewhat higher points than did the uncharged drops in the jet drop streams, illustrated in FIG. 2(*b*). Catchers 78 are now pivoted further into a drop catch position, in FIG. 2(*d*), in which the uncharged drops in the jet drop streams are permitted to pass between the catchers 78, thereby permitting printing with the uncharged drops on a print receiving medium.

At termination of printer operation, the sequence of steps described above with respect to start up is reversed. The catchers 72 are pivoted from the drop catch position shown in FIG. 2(*d*) to the intermediate position of FIG. 2(*c*) such that the lower edges 86 of the catchers 78 are separated substantially, with the jet drop streams impinging upon the drop impingement surfaces 80. The drop charging potentials are then removed from electrodes 76 and, therefore, the jet drop streams pass undeflected and strike the surfaces 80 at somewhat lower positions as shown in FIG. 2(*b*). Additionally, the drop deflection potential is removed from the catchers 78. The catchers 78 are thereafter pivoted, as shown in FIG. 2(*a*), with the charge plates 72 being withdrawn from their operating positions. The lower edges 86 of the catchers 78 are now substantially abutting. At this point, the fluid pressure and stimulation are terminated, with the result that the jet drop streams become unstable prior to the cessation of fluid flow through the orifices 70. The orientation of catchers 78, however, ensures that the drops produced from the unstable jets are collected by the catchers.

Figures 3A, 3B, 4:
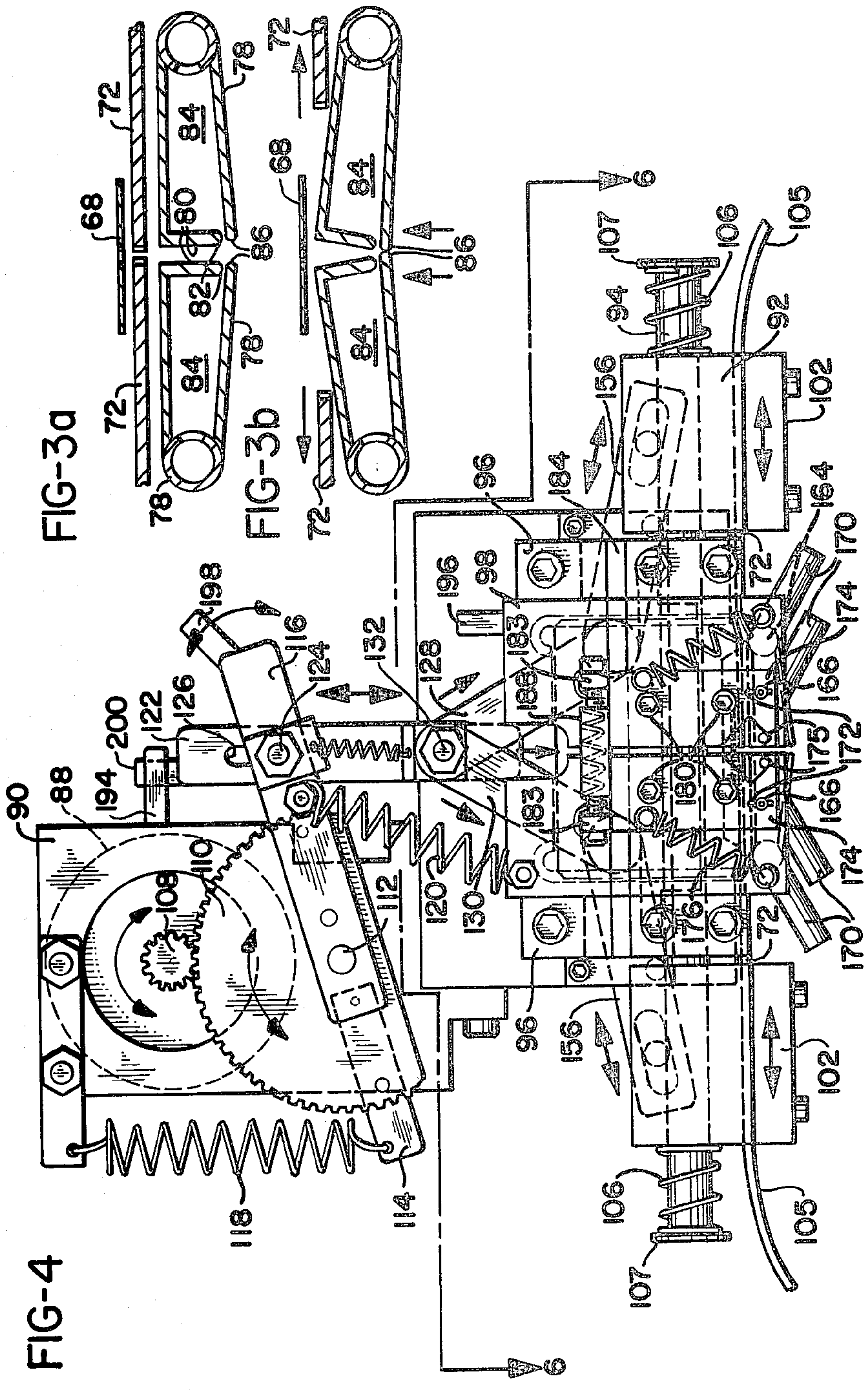
FIG. 4 is an end view of the printer as seen looking generally left to right in FIG. 1.

Reference is now made to FIGS. 4, 5(*a*), 5(*b*), 6, and 7 which illustrate the means for moving the charge electrode means and pivoting the drop catchers as desired at start up and shut down. As shown, a mechanical linkage arrangement interconnects the charge plates 72 and the catchers 78. A motor 88 is mounted on motor support 90 and provides a means for translating this linkage. Although the structure relating to only one end of the print head is illustrated, it will be understood that identical structure is provided at the both ends of the print head.

Figure 6:
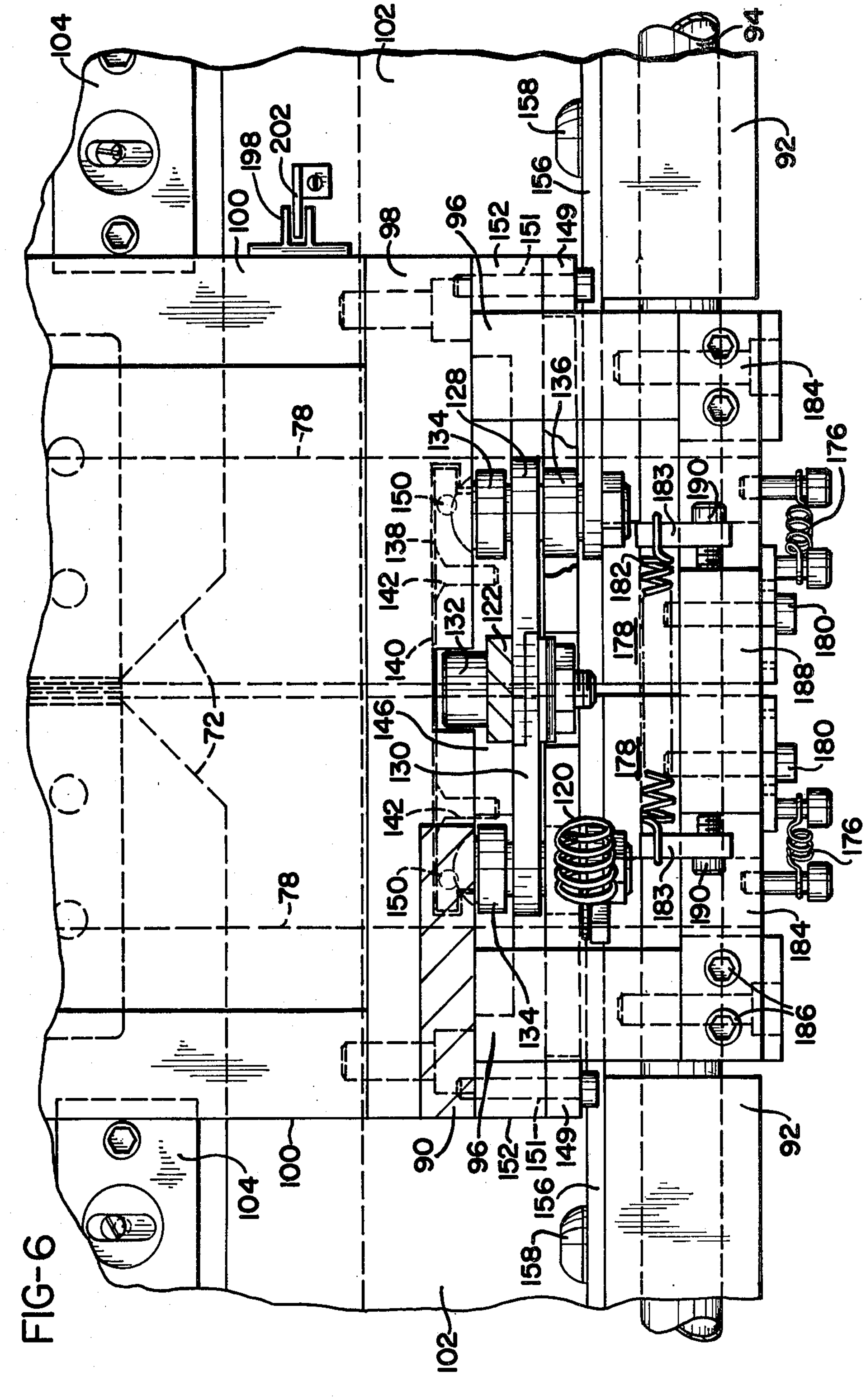
FIG. 6 is a view taken generally along line 5—5 in FIG. 4.

The charge plates 72 are attached to support bearings 92 which may be linear bearings. Support bearings 92 engage shaft 94 which, in turn, is held by members 96. Members 96 are attached to print head end frame 98 which, as seen in FIG. 6, is bolted into side frame members 100 of the print head. Charge plate support bearings 92 are bolted to charge plate support bars 102 which run the length of the print head. Bars 102 are attached to charge plates 72 by means of adjustment mechanisms 104. Also attached to charge plates 72 are conductor cables 105 (FIG. 1) which provide charge potentials to the charge electrodes from an optical scanner which scans an original document or from a data processing circuit.

Springs 106 permit the charge plate bearings 92 to be moved outwardly but provide an inward spring bias against spring retainers 107 which are positioned at the outer ends of rods 94.

As seen in FIG. 4, motor 88, when actuated, rotates gear 108 which, in turn, rotates gear 110 about pivot 112. Arms 114 and 116 are rigidly attached to gear 112 and receive a spring bias from springs 118 and 120, respectively, which tends to rotate gear 110 clockwise. Arm 116 is attached to vertical linkage member 122 by a bolt 124 extending through slot 126. As gear 110 is rotated by motor 88, therefore, vertical link 122 is raised or lowered. As will be described more completely below, raising vertical link 122 results in movement of the charge plates 72 and catchers 78 into their printing operating positions (FIG. 2(*d*) and lowering link 122 results in movement of charge plate 72 and catcher 78 into the positions illustrated in FIG. 2(*a*).

A pair of linkage arms 128 and 130 are pivotally connected to the lower portion of vertical link 122 by means of pivot bolt 132. Rollers 134 and 136 are attached to the lower ends of linkage arms 128 and 130. Sliding plate 138 is positioned in a mating recess 140 in end plate 98 and is attached by screws 142 to roller follower plate 146. Sliding plate 138 and roller follower plate 146 are free to move vertically as constrained by recess 140 in end plate 98. As shown in FIG. 5(*a*) and 5(*b*), sliding plate 138 includes downward extending ears 148 which contact dimples 150 on the upper surfaces of the catchers 78.

Figure 7:
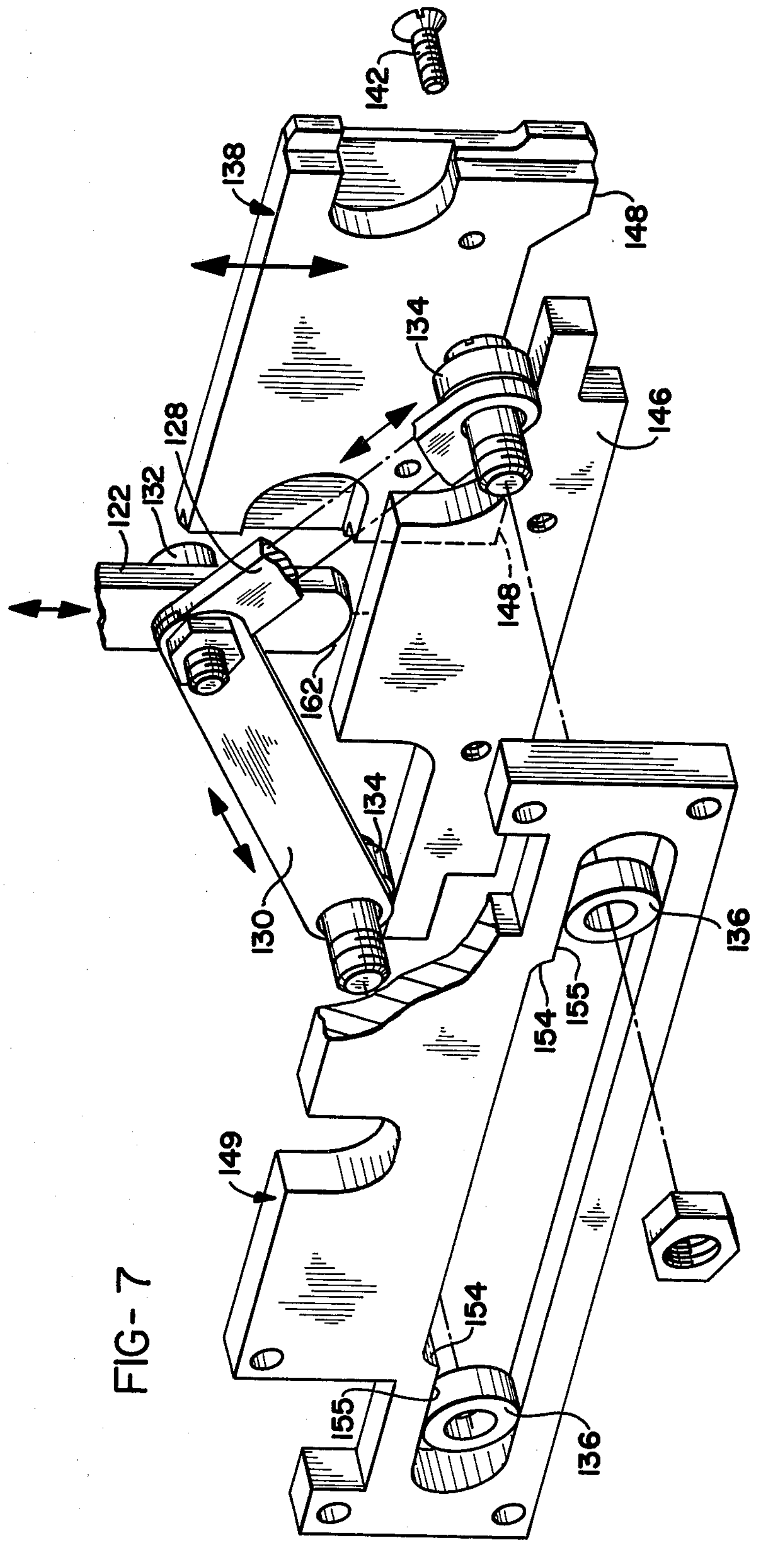
FIG. 7 is an exploded perspective view of a portion of the printer.

As the vertical link 122 is moved downwardly, the linkage arms 128 and 130 push the rollers 134 downward against the roller follower plate 146, causing the sliding plate 138 to tilt the catchers by applying a downward force to dimples 148. The catcher mounting structure which permits the pivoting action of the catchers is described more completely below. As shown in FIG. 5(*a*), the initial downward movement of the linkage arms 128 and 130 is constrained by the roller guide plate 149 which is mounted on end plate 98 by bolts 151 extending through spacers 152. The rollers 134 pressing downward against roller follower plate 146 cause the initial pivoting of the catchers 78. After the rollers 136 have been moved downwardly sufficiently to move around the corner 154 defined by the roller guide track 155 in plate 149, the roller guide track 155 permits the rollers 136 to move generally outward, as shown in FIG. 5(*b*). Links 156, pivotally connected to linkage arms 128 and 130, are moved outward such that bolts 158 extending through slots 160 in links 156 are engaged and charge plate bearings 92 moved outward against the spring bias force of springs 104. The linkage arms 128 and 130, the sliding plate 138, the roller follower plate 146, and plate 149 defining roller guide track 155 are illustrated in FIG. 7 which is an exploded perspective view of this portion of the printer.

At this point, further downward movement of vertical link 122 results in the lower end 162 of link 122 contacting roller follower plate 146, and moving plate 146 and sliding plate 138 even further downward. This last downward movement of plates 146 and 138 pivots the catchers 78 into the full catch position illustrated in FIG. 2(*a*).

The catchers 78 include plastic end portions 164 at each end with pins 166 and 168 extending therefrom. End portions caps 164 are nonconductive and, therefore, provide electrical installation between the catchers and the balance of the printer structure. Vacuum fittings 170 extend downward from the catchers 78 and are connected to vacuum lines 172 (FIG. 1) which provide a means of evacuating the chambers 84 within the catchers 78. Pins 166 are contained within slots 172 in plates 174. Similarly, pins 168 are limited in downward movement by notches 176 in plates 174.

Figure 5A:
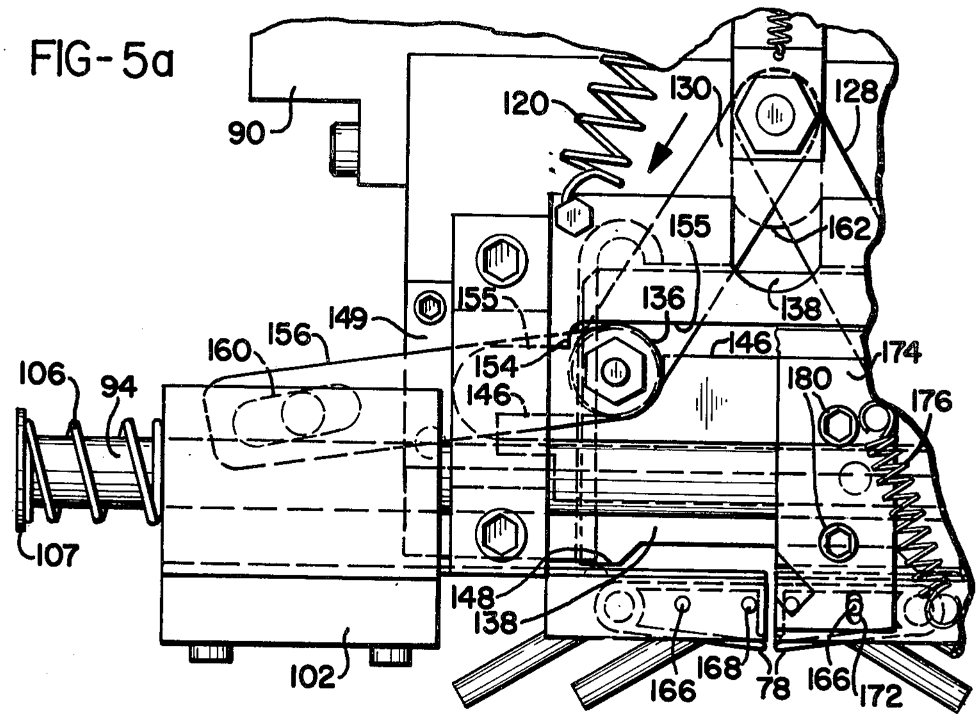
FIGS. 5(*a*) and 5(*b*) are enlarged views of the printer, similar to FIG. 4, showing movement of the linkage arrangement interconnecting the charge electrode plates and the catchers.
Figure 5B:
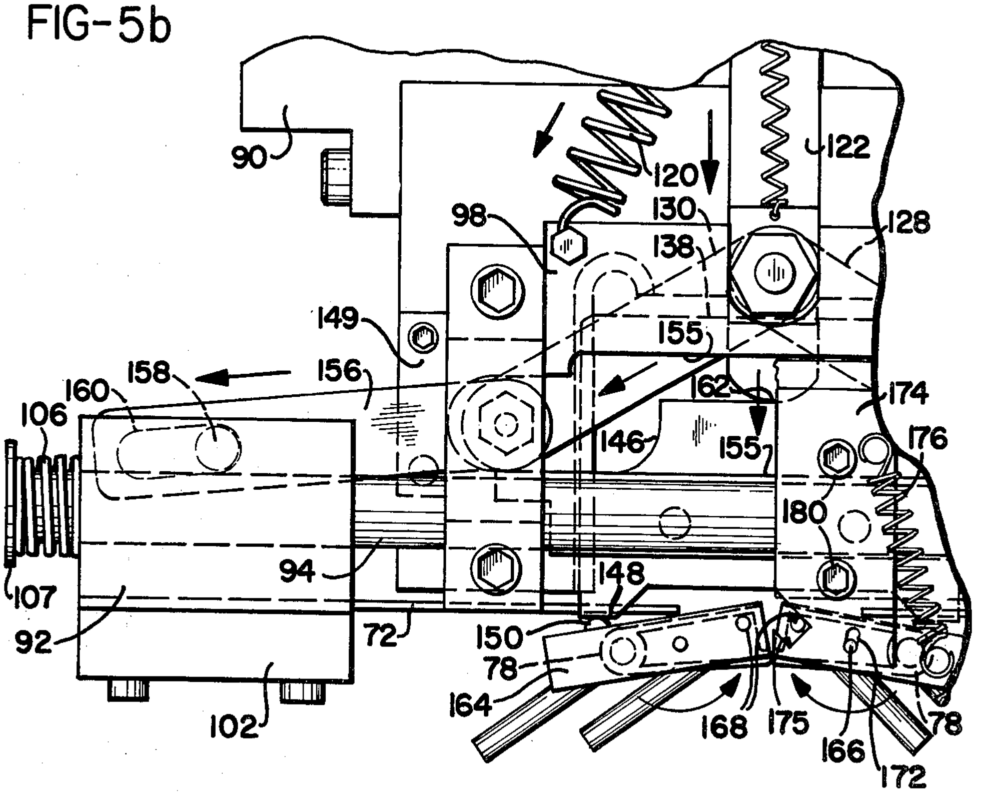

Catchers 78, when initially urged downward by sliding plate 138, are pivoted about pins 168 against the opposing spring force of springs 176. Only one such spring and only one of plates 174 are shown in FIGS. 5*a* and 5*b*, with the other spring 176 and plate 174 being removed to reveal structure beneath. After the catchers 78 have been pivoted downward sufficiently that pins 166 contact the bottom of slots 174, further downward movement of sliding plate 138 results in pivoting of catchers 78 as pins 168 are raised out of notches 175. The catchers 78 are thus pivoted into the full catch position depicted in FIG. 5(*a*).

Plates 174 are bolted to support blocks 178 by bolts 180. Support blocks 178 slidably engage rod 94 and are urged together by spring 182 which engages upward extending tabs 183 from the support blocks 178. Bar 184 extends across members 96 and is attached thereto by bolts 186. A central raised portion 188 of bar 184 is engaged by adjusting bolts 190 which extend through openings in tabs 183. Adjusting bolts 190 permit the position of support blocks 178 to be adjusted, thereby resulting in adjustment of the positions of catchers 78.

As discussed previously, the printer includes identical linkage means at each end thereof to accomplish pivoting of the catchers and movement of the charge plates into and out of their respective operating positions. In order to raise and lower the vertical links 122 at each end of the printer in synchronism, identical gears 110 are provided at each end of the printer. Gears 110 are interconnected by rod 192 (FIG. 1) such that they are rotated together by motor 88.

As discussed above with respect to FIGS. 2*a*–2*d*, initiation and termination of charge potentials and deflection potentials at start up and shut down occur at an intermediate point in the start up and shut down processes. Control of the charge potentials, the deflection potential, and the motor 88 is accomplished by control circuitry. In order to monitor movement of the catchers and the charge plates and provide the control circuitry with an indication of this movement, position detectors 194, 196 (FIG. 4), and 198 (FIG. 6) are utilized. Detector 194 may comprise a light emitting diode optically coupled to a photosensitive diode across a narrow slot. Tab 200, extending upward from vertical link 122, is positioned in the slot when the link 122 is raised. Detector 196 in cooperation with tab 200 senses when the vertical link 122 is completely lowered. Similarly, position detector 198, in conjunction with upward extending tab 202 mounted on charge plate support bar 102, senses when the charge plates 72 are moved into their drop charging positions at start up and out of their drop charging positions at shut down of the printer. Detector 198 thus provides a control signal indicating to the printer control circuit that it is appropriate to initiate charging and deflection at start up and to terminate charging and deflection at shut down. Thus, together detectors 194 and 196 provide indications of the position of link 122 and, therefore, of the positions of the catchers and charge plates.

While the form of apparatus and method herein described constitute a preferred embodiment of the invention, it is to be understood that the invention is not limited to this precise form of apparatus, and that changes may be made therein without departing from the scope of the invention. As an example, the printer of the present invention may also comprise a thin conductive deflection electrode extending between the rows of jet drop streams and having impressed thereon a deflection potential which differs from the potentials applied to the outwardly positioned catchers. Such a deflection electrode is illustrated in U.S. Pat. No. 3,701,998, issued Oct. 31, 1972, to Mathis. By utilizing such a deflection electrode the deflection fields are created by the potential differences between the electrode and each of the catchers. Thus, the drops in each of the jet stream rows may carry a charge of the same polarity as long as the gradients of the deflection fields are appropriate for deflecting the charged drops outwardly to the catchers.

Additionally, the present invention may be embodied in a printer which utilizes only a single row of jet drop streams. In such a printer, only a single catcher is required, with the catcher being pivoted into a full catch position at printer start up and shut down. During operation of the printer, the catcher would be pivoted into an operating position in which only charged drops are deflected to strike the catcher.

What is claimed is:

1. An ink jet printer for depositing ink drops on a print receiving medium, comprising:

print head means for generating a plurality of jet drop streams, said streams being arranged in at least one row, charge electrode means mounted for movement between an inactive position and a drop charging position adjacent said jet drop streams, said charge electrode means providing charging of drops in said jet drop streams when in said drop charging position, a pair of drop catchers, each catcher defining a drop impingement surface, said pair of catchers being pivotable into drop catching positions with said drop impingement surfaces being substantially parallel and positioned on opposite sides of said row of jet drop streams for catching drops deflected thereto by an electrostatic deflection field, and said pair of catchers being pivotable into full catch position in which said drop impingement surfaces are inclined with respect to said row of jet drop streams with the lower edges of said drop impingement surfaces being substantially closer together than when in said drop catching positions, and means for moving said charge electrode means between said drop charging position and said inactive position and, simultaneously, pivoting said pair of drop catchers between said drop catching positions and said full catch positions, whereby drops are caught continuously by said catchers before and after printing without charging of said drops, thus increasing the reliability of start up and shut down.

2. The ink jet printer of claim 1, further comprising:

means for applying a drop deflecting potential between said pair of drop catchers when the lower edges of said drop impingement surfaces are substantially separated, whereby a drop deflection field is created to deflect charged drops toward said catchers.

3. The ink jet printer of claim 1 in which said charge electrode means includes a plurality of charge electrodes, each of said charge electrodes being positioned adjacent a respective one of said jet drop streams when said charge electrode means is in said drop charging position, said printer further comprising means for selectively supplying charging potentials to said charge electrode means when said charge electrode means is in said drop charging position, and for terminating application of such charging potentials to said charge electrode means when said charge electrode means is in said inactive position.

4. The ink jet printer of claim 1 in which said means for moving said charge electrode means and pivoting said pair of drop catchers comprises:

mechanical linkage means interconnecting said charge electrode means and said drop catchers, and means for translating said linkage means.

5. The ink jet printer of claim 4 in which said mechanical linkage means comprises a vertical linkage member, connected to said means for translating said linkage means, said member vertically movable from an upper position to a lower position a pair of downward and outward extending linkage arms, pivotally connected to the lower portion of said linkage member, a pair of rollers pivotally mounted on the lower ends of each of said linkage arms, a sliding plate positioned for downward movement in contact with said drop catchers, thereby applying a pivoting force to said catchers to pivot said catchers from said drop catching positions into said full catch positions, means defining a roller guide track in which one of each of the pairs of rollers mounted on the lower ends of said linkage arms move, and a roller follower plate, rigidly attached to said sliding plate and contacting the other of each of the pairs of rollers, whereby downward movement of said vertical linkage member results in pivoting of said catchers from said drop catching positions into said full catch positions.

6. The ink jet printer of claim 5 in which said print head means generates a plurality of jet drop streams arranged in a pair of parallel rows, in which said charge electrode means comprises a pair of charge electrode plates having mounted thereon a plurality of charge electrodes, said printer further comprising a pair of links, each of said links pivotally attached to the lower end of an associated one of said linkage arms, each of said links further attached to an associated one of said charge electrode plates, whereby said charge electrode plates are moved from said drop charging position to said inactive position as vertical linkage member is moved downward.

7. An ink jet printer for providing deposit of drops from a plurality of jet drop streams on a print receiving medium, comprising:

print head means for generating two parallel rows of jet drop streams directed at said medium, a plurality of charge electrodes mounted on a pair of charge electrode plates, said plates being movable into and out of drop charging positions beneath said print head means in which said charge electrodes are each positioned adjacent a respective one of said jet drop streams in said parallel rows, a pair of catcher means, each defining a drop catching surface and a drop ingesting slot along the lower edge of said drop catching surface, each said catcher means being generally pivotally mounted for rotation about an axis parallel to said rows of jet drop streams for movement from a drop catching position, in which said drop catching surfaces are substantially parallel, to a full catch position in which drop catching surfaces are inclined to face upward and intercept said jet drop streams with said jet drop streams striking said drop catching surfaces and with said drop ingesting slots being positioned closely together, means for selectively applying drop charging potentials to said charge electrodes, means for providing a drop deflecting potential across said catchers, whereby charged drops are deflected by the electric field extending between said catchers, and means for pivoting said catchers from said full catch position to said drop catching position after start up of said print head means and for moving said charge electrode plates into said drop charging positions after said catchers are pivoted sufficiently to apply a drop deflecting potential thereto but while said drop catching surfaces intercept said jet drop streams.

8. The ink jet printer of claim 7 in which said means for applying a drop deflecting potential across said catchers comprises means for terminating application of said drop deflecting potential when said catchers are in said full catch position.

9. The ink jet printer of claim 7 in which said means for pivoting said catchers and for moving said charge electrode plates comprises:

means for pivoting said catchers prior to termination of printer operation from said drop catching position into a position in which drop catching surfaces intercept said jet drop streams with said catchers are spaced apart sufficiently to permit continued application of said drop deflecting potential thereto and, thereafter, moving said charge electrode plates out of said drop charging positions.

10. The method of operation of an ink jet printer, comprising the following steps at the initiation of printer operation:

(a) positioning a pair of drop catchers between a print head and a print receiving medium with the drop impingement surfaces thereof facing generally upward such that the lower edges of said catchers are substantially abutting, (b) generating of a pair of jet drop stream rows, one of each of said pair of rows striking said drop impingement surface of each of said catchers, (c) pivoting said catchers such that the lower edges thereof are separated while continuing to receive said drop streams on said drop impingement surfaces, (d) moving charge electrodes into position above said catchers and adjacent said drop streams, and applying a charging potential to said charge electrodes, for charging drops in said drop streams, while simultaneously applying a drop deflecting potential across said catchers, and (e) pivoting said catchers to a final drop catch position in which said drop impingement surfaces are substantially perpendicular and spaced outwardly from said jet drop stream rows such that only drops which are charged by said charge electrodes and deflected by said drop deflecting potential strike said drop impingement surfaces.

11. The method of operation of claim 10 further comprising the following steps at termination of operation of the printer:

(f) pivoting said catchers such that the lower edges thereof are separated substantially and with drop impingement surfaces facing generally upward such that the jet drop streams impinge thereon, (g) discontinuing application of said drop deflecting potential to said catchers, (h) moving said charge electrodes away from said rows of jet drop streams, and discontinuing application of said charging potential to said charge electrodes, (i) pivoting said drop catchers such that they are positioned together beneath said print head with the lower edges of said catchers substantially abutting and with the drop impingement surfaces thereof facing generally upward, and (j) terminating generation of said jet drop streams.

12. An ink jet printer for depositing ink drops on a print receiving medium, comprising:

print head means for generating a plurality of jet drop streams, said streams being arranged in a row, charge electrode means, including a plurality of charge electrodes, mounted for movement between an inactive position and a drop charging position in which each of said plurality of charge electrodes is positioned adjacent a respective one of said jet drop streams, whereby selective application of charging potentials to said electrodes results in selective charging of said drops in said jet drop streams, a drop catcher defining a drop impingement surface, said catcher being pivotable into a drop catching position with said drop impingement surface being substantially parallel to and positioned to one side of said row of jet drop streams for catching drops deflected thereto by an electrostatic deflection field, and said catcher being pivotable into a full catch position in which said drop impingement surface is inclined with respect to said row of jet drop streams and is positioned in the path of said streams, and means for moving said charge electrode means between said drop charging position and said inactive position and, simultaneously, pivoting said drop catcher between said drop catching position and said full catch position, whereby drops are caught continuously by said catcher before and after printing without charging of said drops, thus increasing the reliability of start up and shut down.

* * * * *